H. MARANVILLE.
Portable Scales.
No. 50,254. Patented Oct. 3, 1865.
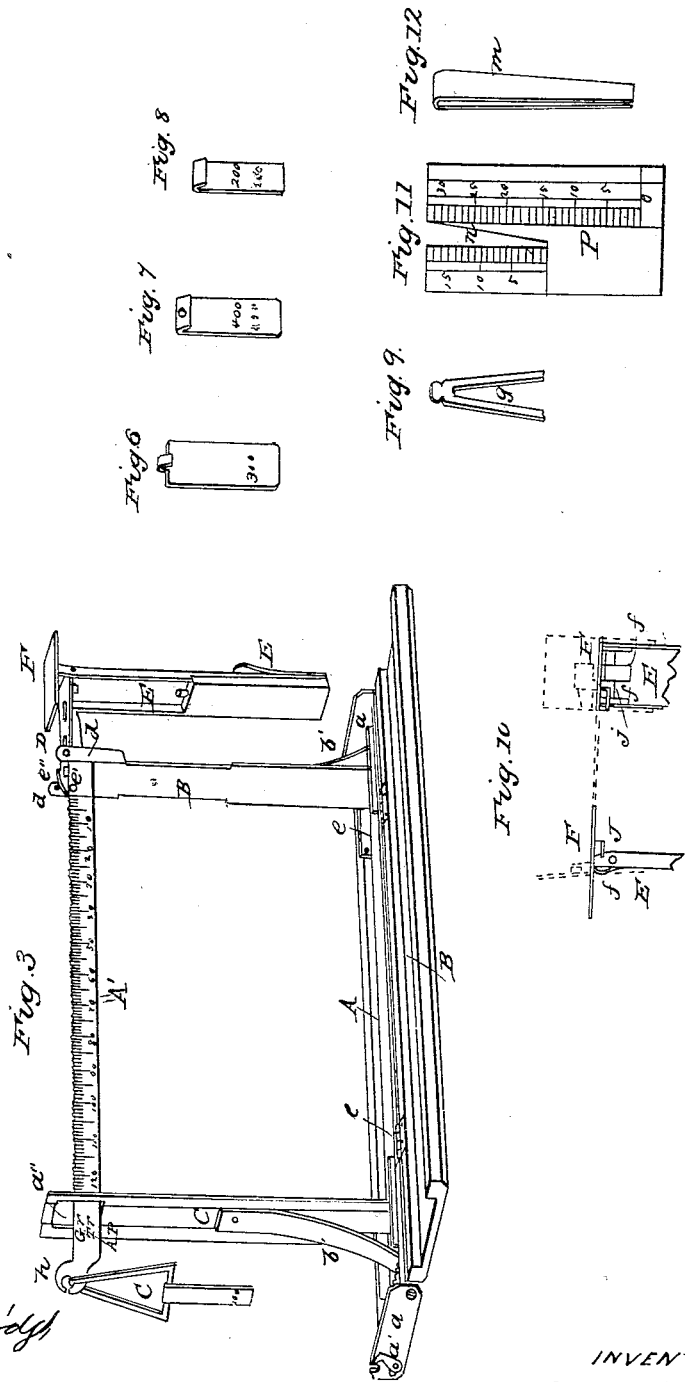

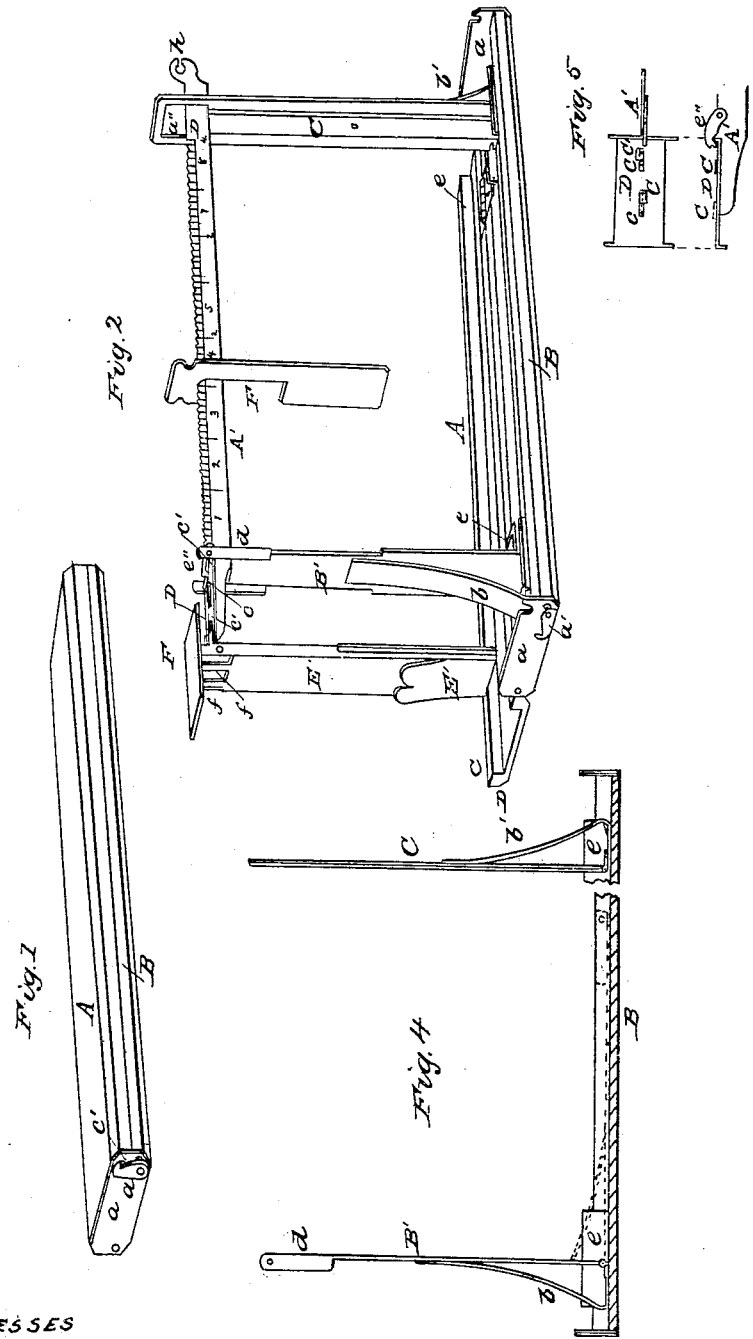

UNITED STATES PATENT OFFICE.

H. MARANVILLE, OF AKRON, OHIO.

IMPROVEMENT IN PORTABLE SCALES.

Specification forming part of Letters Patent No. 50,254, dated October 3, 1865.

*To all whom it may concern:*

Be it known that I, H. MARANVILLE, of Akron, in the county of Summit and State of Ohio, have invented certain new and useful Improvements in a Combined Office Ruler and Scales; and I do hereby declare that the following is a full and complete description of the construction and operation of the same, reference being had to the accompanying drawings, making a part of this specification, in which—

Figure 1 is a perspective view of the ruler with the scales inclosed. Fig. 2 represents the ruler unfolded and adjusted into scales for ascertaining postage-rates, weighing in avoirdupois. Fig. 3 represents the other side of the scales. The other views are sections that will be referred to in the description.

Like letters denote like parts in the views.

My improvement relates to a combined ruler and scales which will answer for an office ruler and scales for ascertaining postage-rates and the true weight of coins, weighing drams and ounces in avoirdupois, grains, ounces, pounds, scruples, drams, &c., in Troy and apothecary weights, being readily changed from one to the other, and is adapted to various purposes, as hereinafter described.

The ruler, as represented in Fig. 1, is made in two parts or sections, A and B, of exactly the same form and size, hinged together on one side, fitting accurately when closed, being secured by means of a plate, $a$, on each end, to which there is pivoted a catch or hook, $a'$, that works onto a pin, $c'$, in the upper part or lid, A. This forms the ruler, the sections of which are recessed out on the inside to contain the scales, weights, &c. The sections of the rule may be connected together by a slide in place of hinges $e$, and can be any desired length not less than twelve inches.

To unfold the ruler and convert it into scales, the hooks $a'$ are turned off the pins and the lid or section A laid back, as shown in Figs. 2 and 3. The figured scale-beam $A'$ is uppermost in the recess, which is taken out and laid aside with the poise, weights, &c. Now, a standard, $B'$, which is hinged to the bottom of the recess, as seen at $e'$ in Fig. 4, is raised up at one end, to one side of which is attached a spring, $b$, that hooks at the lower end onto a lip secured to and turning up from the bottom of the recess, whereby it is firmly retained in a vertical position. A standard, C, pivoted or hinged in the recess like the standard $B'$, is then raised up at the other end and retained erect by a spring-hook, $b'$, similar to $b$.

The figured scale-beam $A'$ has one hundred and twenty-eight notches in the upper edge in the space of eight inches in length, when the rule is twelve inches, and is so divided and numbered on each side as to be perfectly adapted to weighing in avoirdupois, Troy, and apothecary tables, as will be described. The outer end of the beam is formed into a hook, $h$, and the other end is curved upward from the under side, and on the upper edge are formed lips $c\ c$, (seen in Fig. 5,) turning in opposite directions. It is from this end that the beam is put through the opening $a''$ in the upper end of the standard C and placed on the standard $B'$, the lips $c'$ being put through openings $c$ in a beam-plate, D, as indicated by the dotted lines in Fig. 5, the lips projecting from each side on the plate, after being moved along in slots, attaching the end of the scale-beam firmly to it. This plate is connected at one end to the top of the standard $B'$ by a balance-bar, $e'$, turning up like a lip, and which projects beyond the sides of the plate, so as to rest in eyes in side pieces, $d$, of the standard, and there is a catch or hook, $e''$, pivoted to one side of the scale-beam, that, when turned down onto the lip or bar $e'$, prevents the scale-beam from working out of place. To the other end of the plate D is hung a balancing-pendulum, E, which forms a case from about the middle downward, that contains shot or like material, so as to balance. The beam-plate D is pivoted to the standard $B'$ and the pendulum E like a steelyard or scale-joint.

On the upper end of the pendulum is arranged a platform, F, which is hinged to spring $f$, (seen in Figs. 2 and 10,) whereby it can be turned down and secured in a horizontal position, as represented, by a catch, $j$, fitting into a notch in the side of the pendulum, and from which it can easily be released and the platform turned up in a line with the pendulum, as indicated by the dotted lines, for the purpose of being folded into the recess.

$F'$ is a poise adjusted on the scale-beam $A'$, and if it is put in the first notch the scale will exactly balance, if the pendulum is of the right weight; if not, it can be made so by taking out or adding to the material in the case.

On the outside of the pendulum, from the lower end, extends upward a tongue or lip, $E'$, in which a letter can be placed, or any article suspended to be weighed. The scales are now adjusted for weighing in avoirdupois, and by which postage-rates can be ascertained. This side of the scale-beam, as seen in Fig. 1, is divided off into inches, 1, 2, 3, 4, 5, 6, 7, 8, there being sixteen notches in one inch. Each division denotes one-half an ounce, and in weighing a letter, which is either put in the tongue or on the platform, when the poise is in the first division it indicates one rate of postage, if in the second two rates, and so on. Below the figures denoting half-ounces and postage-rates are the figures 1, 2, 3, and 4, two inches apart, which indicate ounces avoirdupois. Each division on the scale is one-sixteenth of an inch apart, and by moving the poise F, which weighs one ounce, one division it will balance one dram, and if one notch, one half-dram. By turning the rule and scale round, the other side toward you, grains in Troy and apothecary hundred-weights are marked on the scale-beam. When the large poise $F'$ is taken off and placed in the recess, and a small poise, $g$, open at the bottom, (shown in Fig. 9,) is put on the scale-beam at the first notch, a balance-weight, G, is hung on the hook $h$ at the end of the scale-beam, when the scale will balance. The balance-weight must always be in this position when this side of the scale is used and the small poise. The scale is now changed from an avoirdupois to a Troy and apothecary scale. This side of the scale-beam is divided and every tenth notch numbered 10, 20, &c. One notch, with the small poise, weighs one grain in Troy or apothecary weights. The grain, ounce, and pound in Troy and apothecary weights are alike; but pennyweights in one, drams and scruples in the other, require a different number of grains. When it is desired to weigh over one hundred and twenty-eight grains the weights represented in Figs. 3, 6, 7, and 8 must be used, weighing one hundred, two hundred, four hundred, eight hundred grains, that are suspended or hooked into the balance-weight G, as represented in Fig. 3.

By this scale, as now adjusted, coins, scraps of gold and silver, or any small parcels, can be weighed, by putting them on the platform or suspending them to the pendulum, which is sometimes necessary in obtaining the specific gravity of liquids, or anything that cannot well be placed on the platform. Coins can be thoroughly tested by first weighing them, and then by means of a gage-plate, P, and caliper $m$, (shown in Figs. 11 and 12,) their diameter and thickness can be ascertained. By placing the coin on the plate with one edge at $o$ the degree or mark on the scale at the opposite edge of the coin will indicate its diameter, and by holding the coin in the caliper and inserting it in the incision $n$, its thickness will be noted on the scale. This gage-plate and caliper are contained in the recess with the scales.

This scale answers the purpose of a hydrometer for ascertaining the value or strength of spirits in the usual manner for obtaining the specific gravity of liquids, and of solids heavier or lighter than water by the usual process, and for an oil-meter.

There is a great variety of objects for which the scales are perfectly adapted, and the scale-beam $A'$, when detached, with the large poise $F'$, can be weighed from one half-dram to four ounces avoirdupois, and with the small poise $g$ and balance-weight can be weighed from one grain up to one thousand six hundred and twenty-eight grains Troy.

When it is desired to fold up the scales, the poise, weights, &c., are removed from the scale-beam and the beam detached from the plate D and standards by turning back the catch $e''$ and disengaging the lips from the plate D and passing it out through the opening $a''$. The spring $b'$ is unhooked from the lip and the standard C turned down flat on the bottom of the recess. The platform F, pivoted to the pendulum, when the catch $j$ is detached, by means of the springs $f$, is turned up, as indicated by the dotted lines in Fig. 10, when the standard $B'$ is turned down in the recess, with the plate D, platform, and pendulum folded down flat upon it. The poises, weights, &c., are adjusted in the recess with the scale-beam on top, when the cover is turned down and fastened, as before described, thus converting the scale into a ruler, and it can readily be changed from one to the other, and can be made to answer a great variety of purposes not herein mentioned.

The ruler, as represented and described, forms the base of the scales, and when they are folded up it forms a case in which they are inclosed.

What I claim as my improvement, and desire to secure by Letters Patent, is—

1. The standards $B'$ and C, jointed or hinged to the rule, in combination with the spring-hooks $b\ b'$, as and for the purpose set forth.

2. The lips $c'\ c'$, plate D, openings $c\ c$, in combination with the scale-beam $A'$, pendulum E, and standard B, as and for the purpose set forth.

3. The springs $f$, platform F, catch $j$, pendulum E, and plate D, constructed and arranged as and for the purpose set forth.

H. MARANVILLE.

Witnesses:
W. H. BURRIDGE,
A. W. MCCLELLAND.